(12) United States Patent
Chen et al.

(10) Patent No.: US 10,155,332 B2
(45) Date of Patent: Dec. 18, 2018

(54) IN-MOLD VIBRATILE INJECTION COMPRESSION MOLDING METHOD AND MOLDING APPARATUS THEREOF

(71) Applicant: National Taiwan University of Science and Technology, Taipei (TW)

(72) Inventors: Chao-Chang Chen, Taipei (TW); Feng-Chi Lee, Taipei (TW); Kun-Lin Wang, Taipei (TW); Ching-Hsien Yeh, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 600 days.

(21) Appl. No.: 14/795,879

(22) Filed: Jul. 9, 2015

(65) Prior Publication Data

US 2015/0336316 A1 Nov. 26, 2015

Related U.S. Application Data

(63) Continuation-in-part of application No. 13/492,865, filed on Jun. 10, 2012, now abandoned.

(30) Foreign Application Priority Data

Dec. 9, 2011 (TW) .................................. 100145683

(51) Int. Cl.
*B29C 45/56* (2006.01)
*B29L 31/34* (2006.01)
(Continued)

(52) U.S. Cl.
CPC .......... *B29C 45/568* (2013.01); *B29C 45/561* (2013.01); *B29C 45/372* (2013.01);
(Continued)

(58) Field of Classification Search
CPC ..... B29C 45/568; B29C 45/76; B29C 45/561; B29C 2945/76006
See application file for complete search history.

(56) References Cited

U.S. PATENT DOCUMENTS 3,907,474 A * 9/1975 Blaser .................. B30B 11/022
425/149
4,500,280 A * 2/1985 Astier .................. B29C 45/585
425/174.2
(Continued)

*Primary Examiner* — Yogendra N Gupta
*Assistant Examiner* — Ninh Le
(74) *Attorney, Agent, or Firm* — Muncy, Geissler, Olds & Lowe, P.C.

(57) ABSTRACT

An in-mold vibratile injection compression molding method and molding apparatus thereof are described. While performing a filling stage, a first piezoelectric actuator and a second piezoelectric actuator are use to vibrate the molding material along at least two directions for precisely filling the molding material into the micro-structure by adjusting the filling flow velocity of the molding material associated with the proper molding material temperature and by maintaining a molding material temperature of a skin solidified layer in the cavity between a glass transition temperature and a melting temperature in order to avoid the form error, to increase the groove filling rate and to improve the residual stress.

14 Claims, 13 Drawing Sheets

(51) Int. Cl.
*B29L 11/00* (2006.01)
*B29C 45/76* (2006.01)
*B29C 45/37* (2006.01)

(52) U.S. Cl.
CPC ........ *B29C 45/76* (2013.01); *B29C 2045/565* (2013.01); *B29C 2945/7604* (2013.01); *B29C 2945/76006* (2013.01); *B29C 2945/76257* (2013.01); *B29C 2945/76381* (2013.01); *B29C 2945/76384* (2013.01); *B29C 2945/76933* (2013.01); *B29C 2945/76943* (2013.01); *B29L 2011/0016* (2013.01); *B29L 2031/3406* (2013.01)

(56) References Cited

U.S. PATENT DOCUMENTS

2005/0236729 A1* 10/2005 Arnott ................... B29C 45/568
                                                        264/71
2008/0088066 A1*  4/2008 Ferguson .............. B29C 45/561
                                                        264/443

* cited by examiner

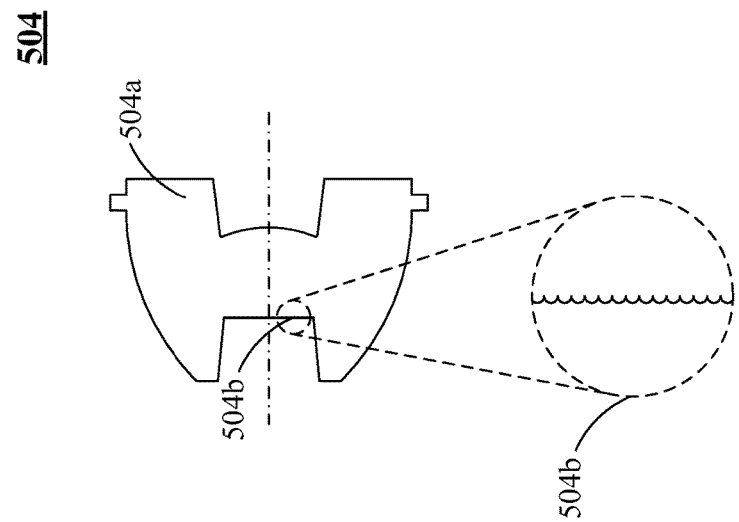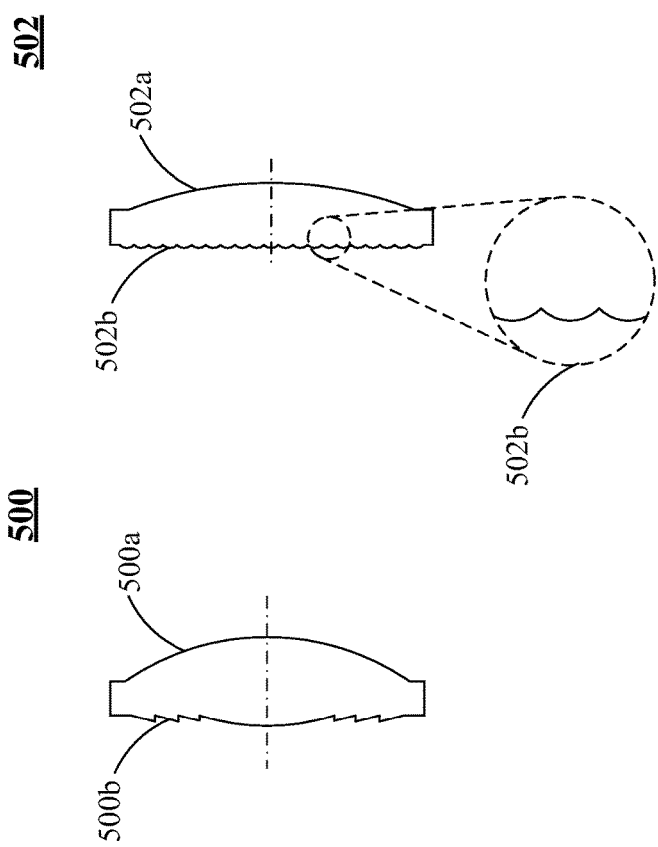
FIG. 5C
FIG. 5B
FIG. 5A

IN-MOLD VIBRATILE INJECTION COMPRESSION MOLDING METHOD AND MOLDING APPARATUS THEREOF

This patent application is a continuation-in-part application and claims priority of U.S. patent application Ser. No. 13/492,865, entitled "IN-MOLD VIBRATILE INJECTION COMPRESSION MOLDING METHOD AND MOLDING APPARATUS THEREOF", which is filed on Jun. 10, 2012, incorporated herein by reference.

FIELD OF THE INVENTION

The present invention relates to a molding method and molding apparatus thereof, and more particularly to an in-mold vibratile injection compression molding method and molding apparatus thereof.

BACKGROUND OF THE INVENTION

With the rapid development of the light source of light-emitted diode (LED) and solar energy, the enhancement smaller size of optoelectronic products have been provoked. Plastics materials have been widely used in precise molding optical components the optoelectronic products, especially for the mobile devices. Further, optical lens used in the optoelectronic products gradually downsizes so the hybrid optical elements (HOEs) have been developed to be one solution to replace the complicated optical lens set.

For molding optical components with optical plastic, include injection molding and hot embossing have been considered and applied in current development and production. Since the smaller feature and shorter life cycle of related consumer electronics product has been a tendency in market, the plastics materials gradually replace the optical glass. Advantages of plastics materials include the lower weight and density, easily formed the complicated curved surface, mass production, low cost and no secondary processing. When the mobile phone with picture-taking function of high display quality and micro-projector have been developed, it is necessary to shrink the size of the optical component and also with structured optics for better optical image quality.

Basically, the factors associated with the optical plastic component of HOE or aspherical lens with micro structures include: (1) form error; (2) groove filling rate; and (3) residual stress. The form error is obtained after molding material injected into mold cavity, which results in the optical design deviation of the plastic component due to the materials shrinkage of molding part, and the optical image quality is downgraded. The groove filling rate is easily limited to the manufacturing process and multi-scale dimension consideration, which causes the design size and shape of the microstructure to be deviated after a molding step and debit effects on the optical property. When the optical plastic components are injected, the plastic subjected to the steps of high temperature, high pressure and high shear stress so that the residual stress, is induced in the molding part. The residual stress during the injection molding step includes: the flow-induced cause; and (2) the thermally induced cause. Besides the stress birefringence induced by the residual stress affects the optical property of the molding part, a crack, shrinkage and warped appearance and lower mechanical strength may be simultaneously induced.

The various factors during the process of injection molding will affect the form error, the groove filling rate and residual stress in different levels and thus the three properties should be evaluated correctly. Consequently, there is a need to develop a novel molding device and molding method to solve the aforementioned problems of form error, groove filling rate of microstructure and residual stress for the effect on the optical quality, especially for HOE of optical applications.

SUMMARY OF THE INVENTION

The objective of the present invention is to provide an in-mold vibratile injection compression molding method and molding apparatus thereof. When the first and second piezoelectric actuators reciprocally vibrate along at least two directions, the molding material can be precisely injected to the microstructure in the filling stage. Specifically, the molding material can be precisely injected to the microstructure in the filling stage based on the skin solidified layer between a glass transition temperature and a melting temperature, the vibrating manner by the first piezoelectric actuator during the filling stage, and the adjustment of the filling flow velocity of the molding material associated with the proper molding material temperature.

According to the above objective, the present invention sets forth the in-mold vibratile injection compression molding method. In one embodiment, the in-mold vibratile injection compression molding method applicable to an in-mold vibratile injection compression molding apparatus, wherein the in-mold vibratile injection compression molding apparatus comprises a stationary structure, a fixed core, a movable unit comprising a movable core and a movable retainer, a pressure sensor, a first piezoelectric actuator, a second piezoelectric actuator, and wherein the fixed core is placed opposite to the movable core to form a cavity with a microstructure and the movable retainer has a guiding hole, the in-mold vibratile injection compression molding method comprising the steps of:

(a) filling a molding material into the cavity for maintaining a molding material temperature of a skin solidified layer in the cavity between a glass transition temperature and a melting temperature;

(b) closing the movable core and the fixed core together such that the molding material is injected by the movable core to perform an injection compression process;

(c) sensing a pressure value of the cavity by the pressure sensor and outputting a pressure sensing signal;

(d) reciprocally propelling the movable core by the first piezoelectric actuator for reciprocally vibrating the movable core along a first direction in accordance with the pressure sensing signal when the pressure sensing signal is less than a peak pressure value of the cavity during the step of filling the molding material into the cavity; and (e) reciprocally propelling the movable core by the second piezoelectric actuator for reciprocally vibrating the movable core along a second direction in accordance with on the pressure sensing signal when the pressure sensing signal is less than the peak pressure value during the step of filling the molding material into the cavity wherein the first direction is different from the second direction.

In one embodiment, during the step (e), a recess is provided for containing the second piezoelectric actuator for reciprocally vibrating the movable core along the second direction, and the recess is provided in the place selected from one group consisting of a first annular recess of a periphery of the movable core, a second annular recess of the external periphery of the first piezoelectric actuator, a third annular recess of a sidewall of the guiding hole, a fourth annular recess within the movable retainer, a fifth annular recess of a periphery of the movable retainer and the combinations thereof.

In one embodiment, after the step (c), the method further comprises a step of: sensing the molding material temperature in the cavity by using a temperature sensor, and outputting a temperature sensing signal corresponding to the molding material temperature.

In one embodiment, the amplitude of the pressure sensing signal comprises a range from 40% of a maximum pressure value (PM) of the cavity to 90% of the PM of the cavity, and wherein the skin solidified layer is operated in a liquid phase and a semi-liquid phase of the molding material during the step of filling the molding material.

In one embodiment, during the step of filling the molding material into the cavity, the method further comprises a step of detecting a thickness of the skin solidified layer of the molding material to compare the thickness of the skin solidified layer and the thickness of the microstructure.

In one embodiment, when the thickness of the skin solidified layer is less than the thickness of the microstructure of the cavity, the step (d) and/or step (e) are performed until the thickness of the skin solidified layer is either equal to or greater than the thickness of the microstructure during the step of filling the molding material into the cavity.

In one embodiment, a specific volume of the molding material in the cavity is changed by varying the molding material temperature to adjust a filling flow velocity of the molding material in the cavity during the step of filling the molding material into the cavity.

In one embodiment, when the molding material temperature is increased, the specific volume is increased for raising the filling flow velocity to rapidly move the molding material into the microstructure of the cavity based on the pressure sensing signal during the step (d) and/or step (e).

In one embodiment, when the molding material temperature is decreased, the specific volume is decreased for decreasing the filling flow velocity to stably move the molding material into the microstructure of the cavity based on the pressure sensing signal during the step (d) and/or step (e).

In one embodiment, when a shear rate of the molding material is changed by the filling flow velocity of the molding material based on an adjustment of the molding material temperature, the viscosity of the molding material is adjusted according to the shear rate which is positively related to the filling flow velocity.

In one embodiment, the shear rate of the molding material is increased when a viscosity of the molding material in the cavity is decreased to rapidly move the molding material into the microstructure of the cavity based on the pressure sensing signal.

In one embodiment, a thickness scale of the microstructure has a range from 0.01 micrometer to 1000 micrometer.

In one embodiment, the thickness scale of the microstructure has the range from 0.1 micrometer to 100 micrometer.

In one embodiment, an injection velocity of the molding material is initially adjusted to control an initial velocity of the molding material before the step of filling the molding material into the cavity.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 5A-5C are schematic plane views of the molding parts according to various embodiments of the present invention.

DETAILED DESCRIPTION OF THE PREFERRED EMBODIMENTS

Figure 1:
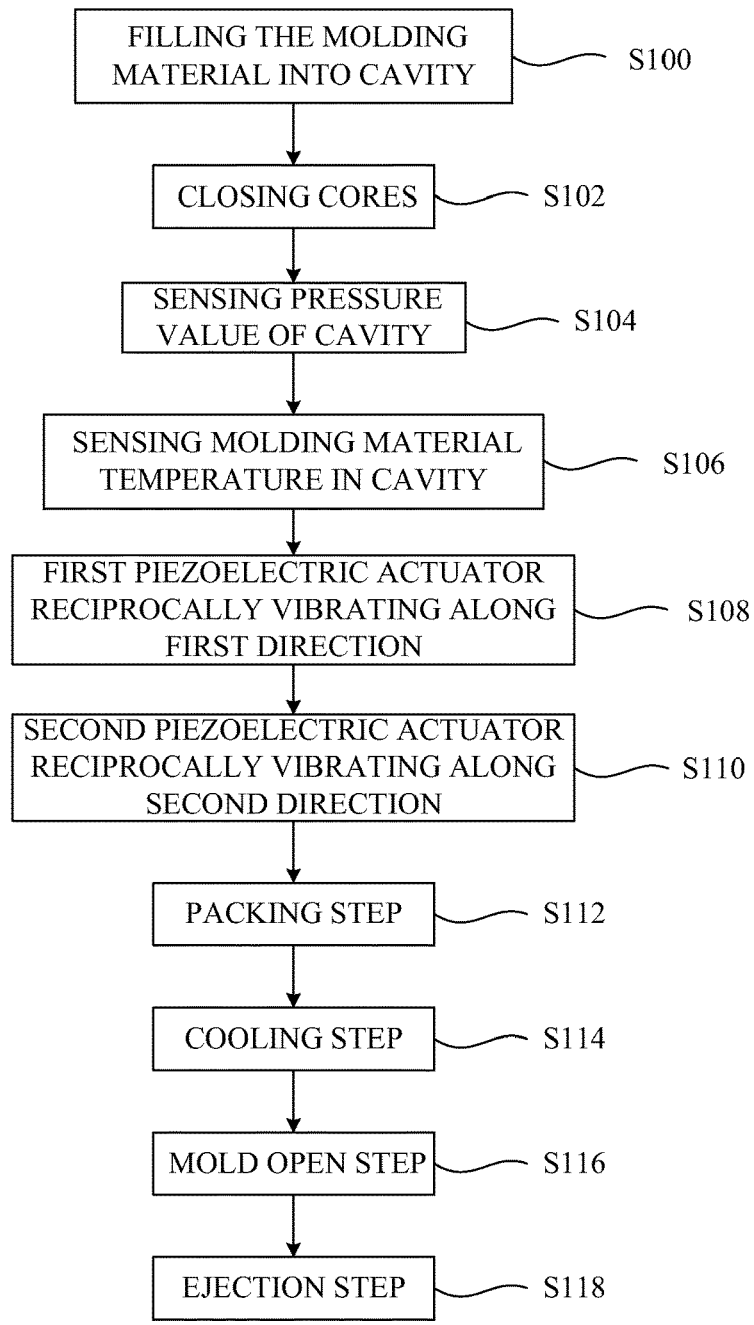
FIG. 1 is a flow chart of performing an in-mold vibratile injection compression molding method according to one embodiment of the present invention.
Figure 2A:
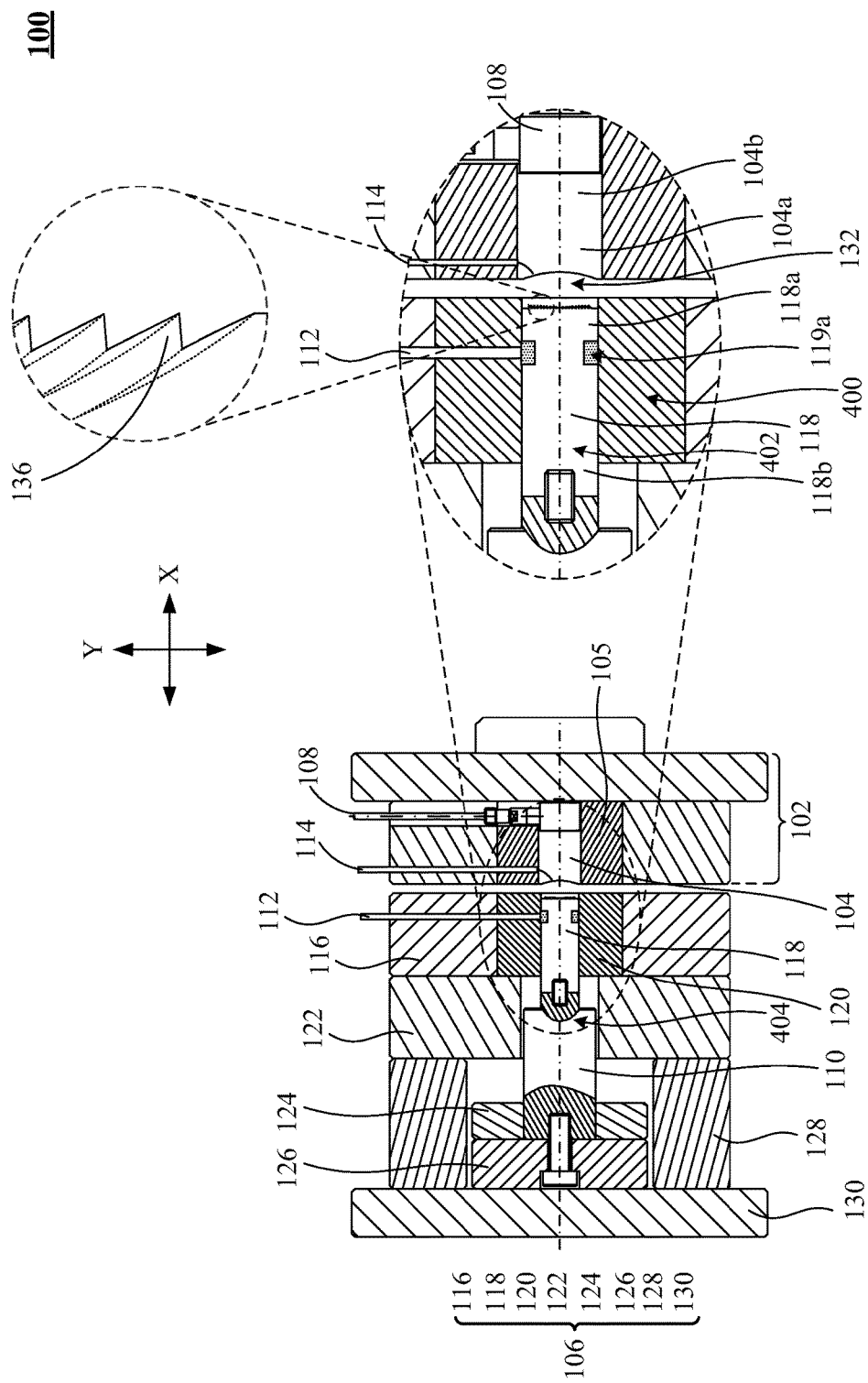
FIGS. 2A-2F are schematic cross-sectional process views of performing an in-mold vibratile injection compression molding method in an injection molding equipment according to one embodiment of the present invention.

Please refer to FIG. 1 and FIGS. 2A-2F. FIG. 1 is a flow chart of performing an in-mold vibratile injection compression molding method according to one embodiment of the present invention. FIGS. 2A-2F are schematic cross-sectional process views of performing an in-mold vibratile injection compression molding method in an injection molding equipment according to one embodiment of the present invention. The in-mold vibratile injection compression molding method is performed by an in-mold vibratile injection compression molding apparatus 100, as shown in FIG. 2A. The vibratile injection molding apparatus 100 includes a stationary structure 102, a fixed core 104, a stationary retainer 105, a movable structure 106, a pressure sensor 108, a first piezoelectric actuator 110, a second piezoelectric actuator 112 and a temperature sensor 114. The movable structure 106 includes a first sustaining plate 116, a moveable core 118, a movable retainer 120, a second sustaining plate 122, a first ejection plate 124, a second ejection plate 126, a first moveable molding base 128 and a second moveable molding base 130. The fixed core 104 is placed opposite to the movable core 118 to form a cavity 132 and the movable retainer 120 has a guiding hole 402.

In FIG. 2A, the stationary structure 102 separates from the movable structure 106. The in-mold vibratile injection compression molding method includes the following steps.

Figure 2B:
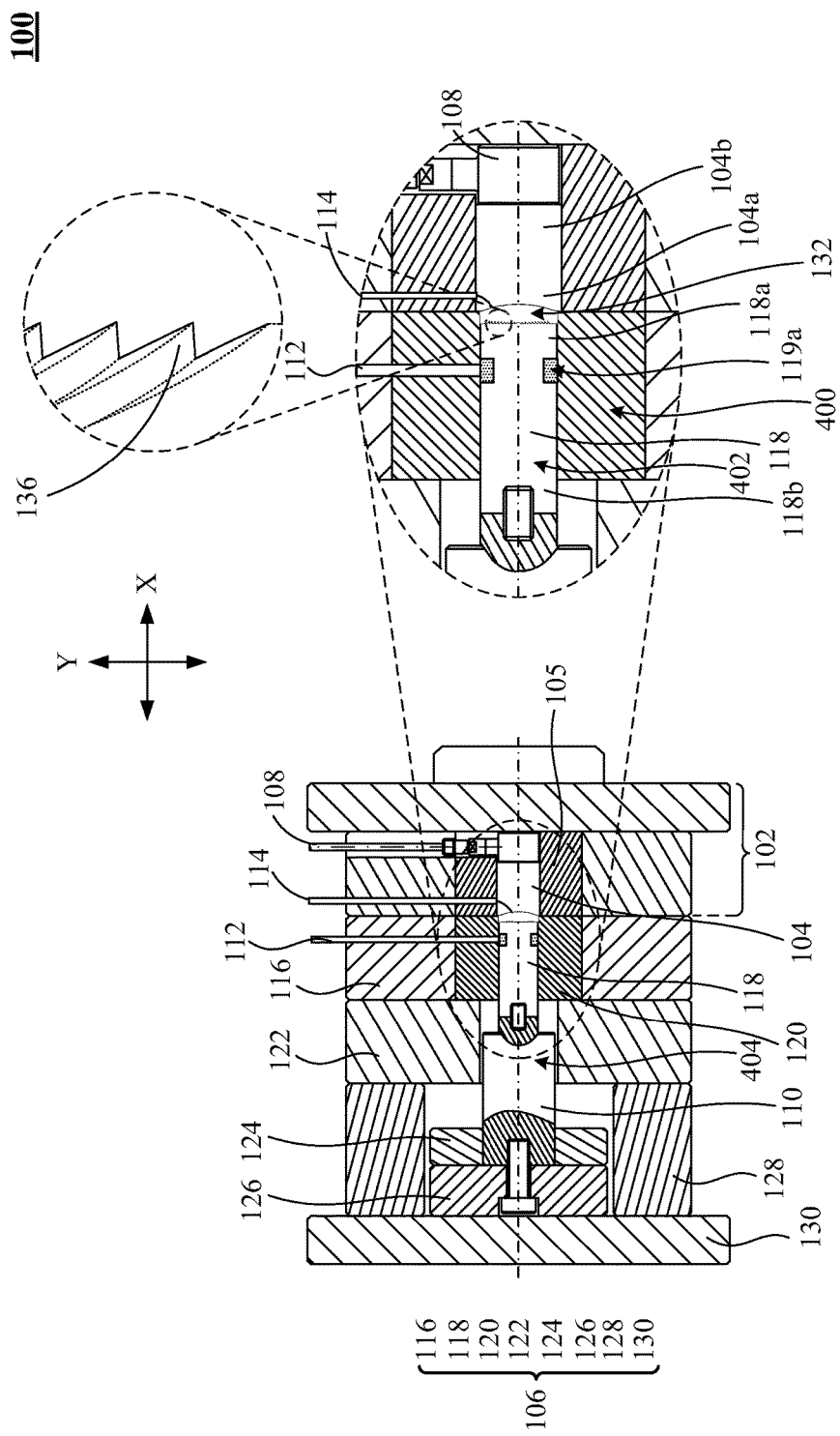
Figure 2C:
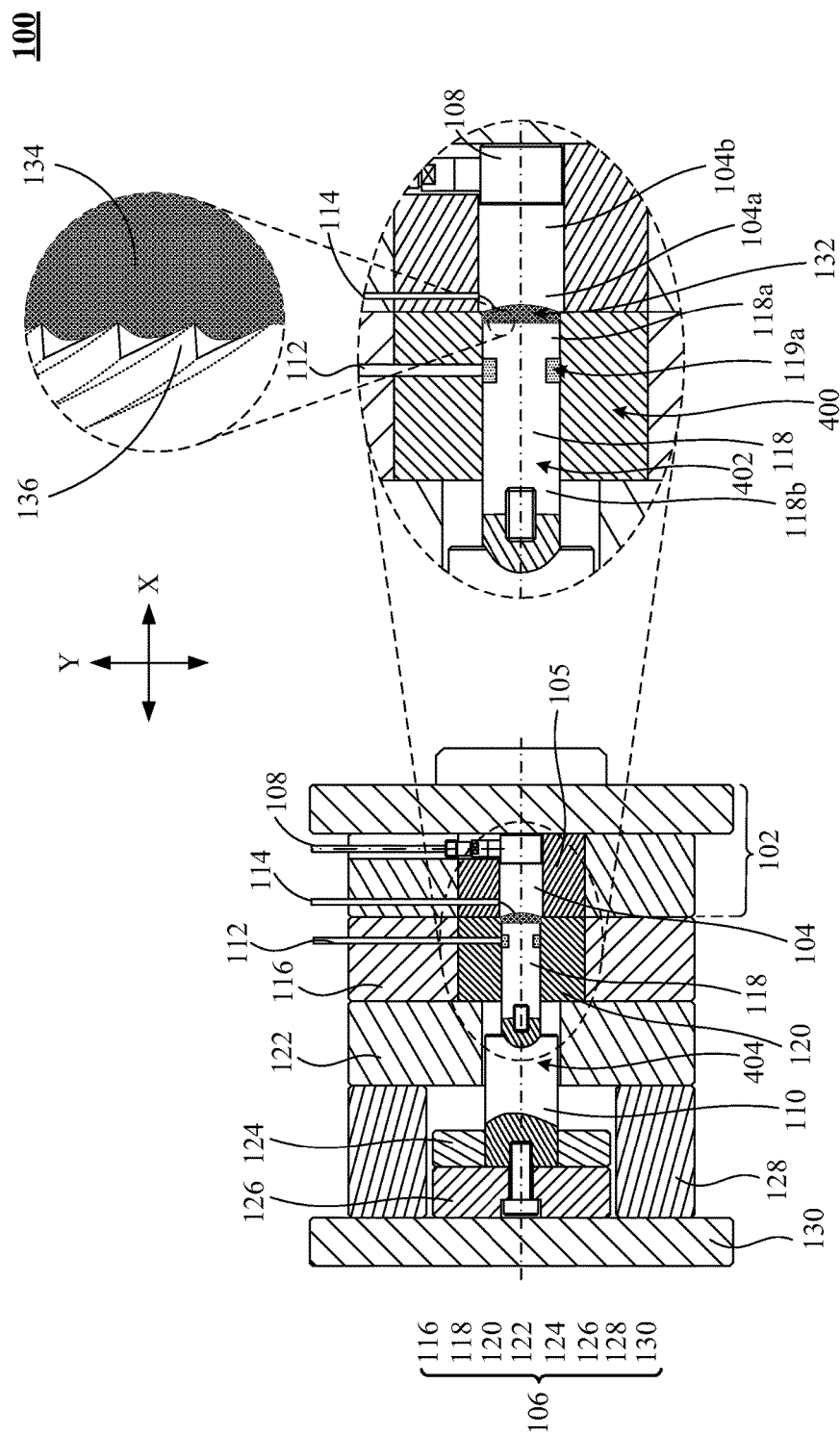

In step S100, the molding material 134 is filled into the cavity 132. That is, the molding material 134 is injected to the cavity 132, as shown in FIG. 2B.

In step S102, the stationary structure 102 and the movable structure 106 close together to perform a step of close molding. In other words, the fixed core 104 closes to the movable core 118 for allowing the molding material 134 to be injected through the movable core 118 to perform an injection compression process.

In step S104, the pressure sensor 108 senses a pressure value of the cavity 132 for outputting a pressure sensing signal.

In step S106, a temperature sensor 114 senses a molding material temperature in the cavity 132 for outputting a temperature sensing signal corresponding to the molding material temperature.

Figure 2D:
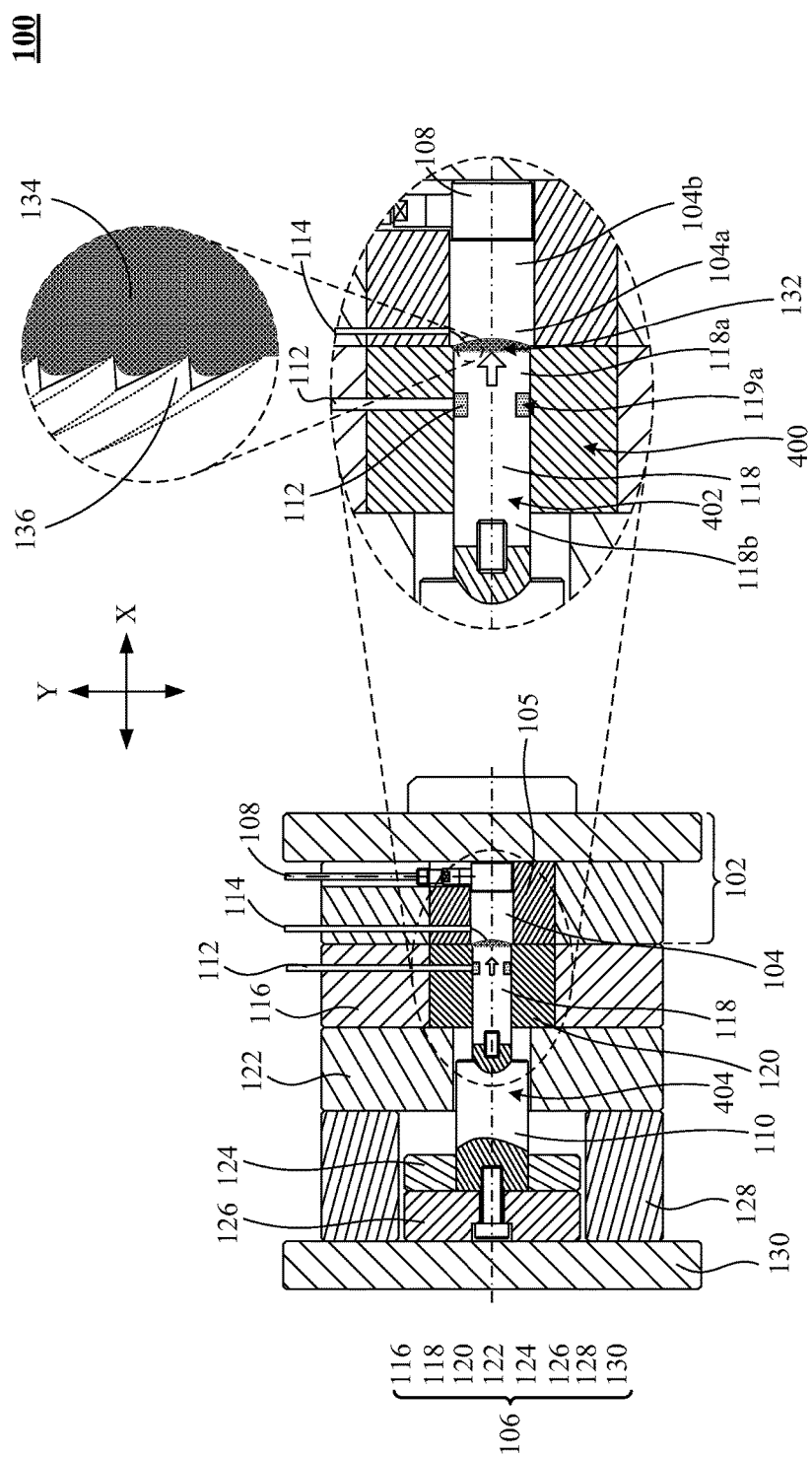
Figure 2E:
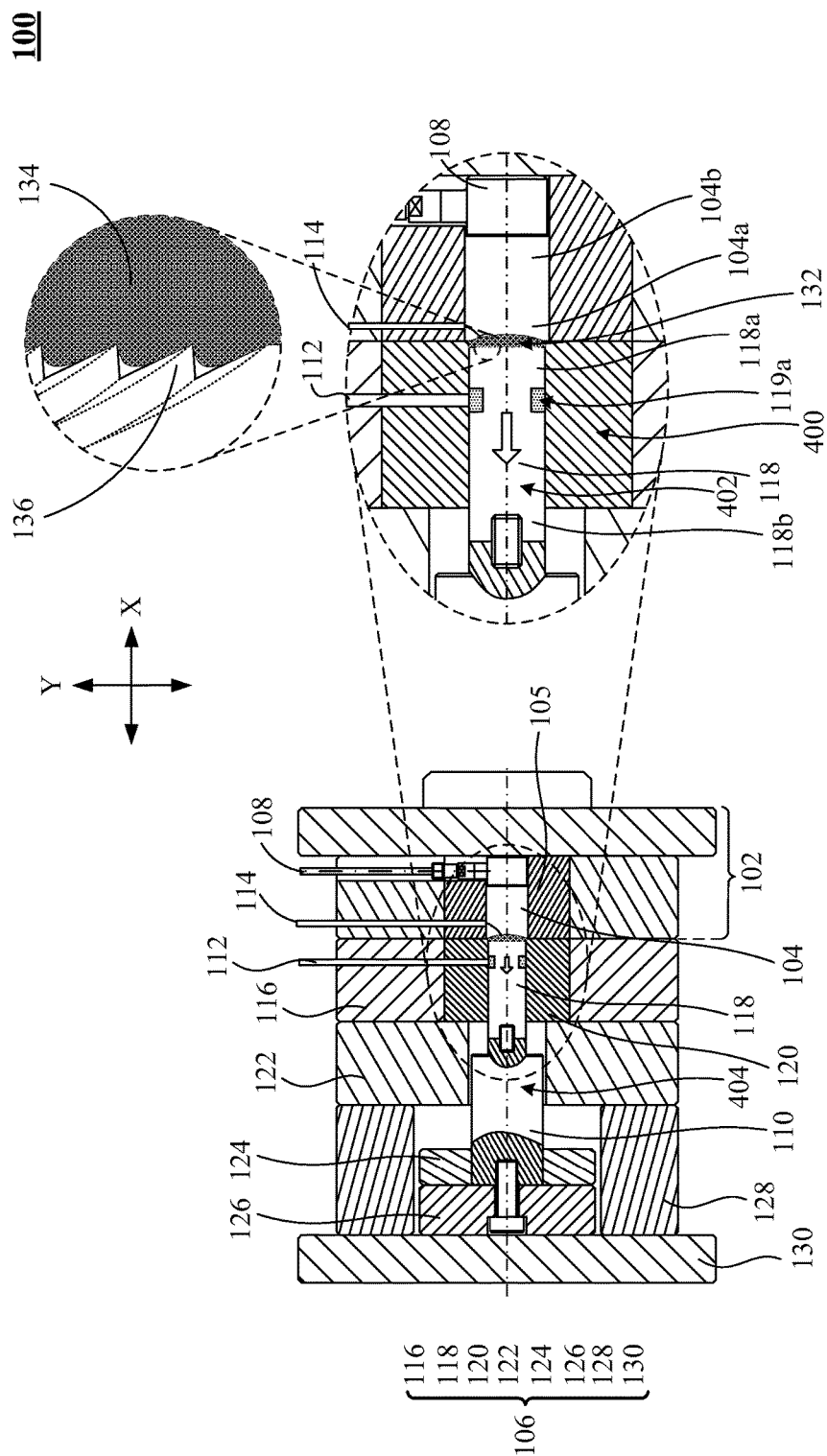
Figure 2F:
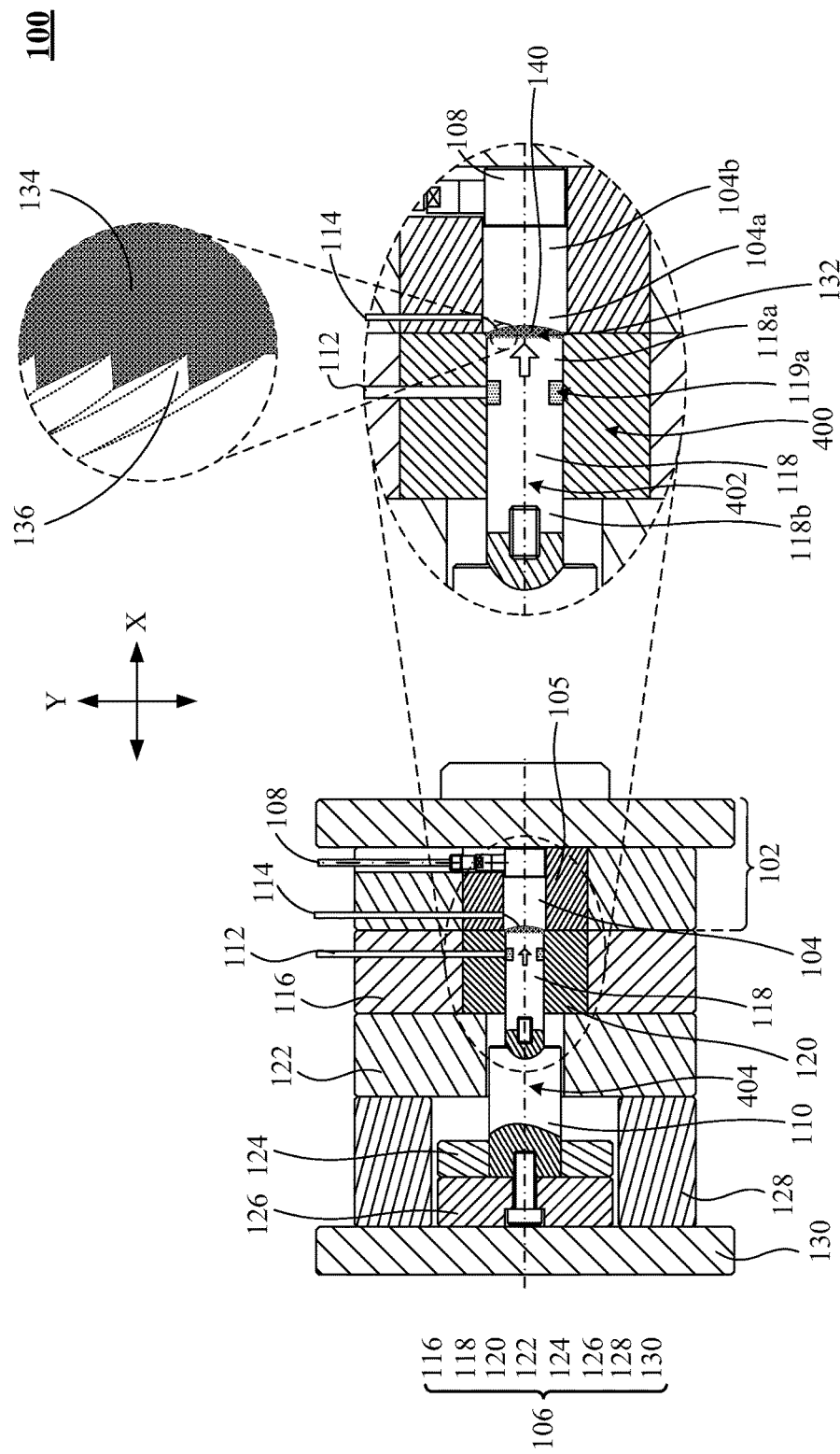

In step S108, the first piezoelectric actuator 110 reciprocally propels the movable core 118 when the pressure sensing signal is less than a peak pressure value of the cavity 132 for reciprocally vibrating the movable core 118 along a first direction X in accordance with the pressure sensing signal, as shown in FIG. 2D through FIG. 2F.

In step S110, the second piezoelectric actuator 112 reciprocally propels the movable core 118 for reciprocally vibrating the movable core along a second direction Y in accordance with the pressure sensing signal when the pressure sensing signal is less than the peak pressure value wherein the first direction X is different from the second direction Y, as shown in FIG. 2D through FIG. 2F. Preferably, the first direction X is perpendicular to the second direction Y.

According to the above-mentioned descriptions in the step S106, the temperature sensor 114 disposed in the stationary structure 102 senses the molding material temperature in the cavity 132 for outputting a temperature sensing signal corresponding to the molding material temperature. If the pressure sensing signal is less than a peak pressure value of cavity 132, the molding material temperature is between the glass transition temperature (Tg) and the melting temperature (Tm) which is greater than the temperature Tg wherein the peak pressure value is defined as the maximum pressure value (PM) of the cavity 132. Preferably, the amplitude of the pressure sensing signal has a range from 40% of PM, i.e. point Pa in FIG. 3A, to 90% of PM, i.e. point Pb in FIG. 3A. In one case, the amplitude of the pressure sensing signal is the arbitrary pressure interval below the maximum pressure value (PM). In another case, the peak pressure value is the arbitrary pressure interval below the maximum pressure value (PM) during the filling stage.

Specifically, while the molding material 134 is filled into the cavity 132, a skin solidified layer 131 on the contact sidewall of the cavity 132 is formed by the heat transfer mechanism due to the temperature difference between the sidewall of cavity 132 and the molding material 134. That is, the molding material is filled into the cavity 132 for maintaining a molding material temperature of a skin solidified layer 131 in the cavity 132 between a glass transition temperature (Tg) and a melting temperature (Tm). Furthermore, the cavity 132 also contains a melted molding material of a molding material having a molding material temperature above the melting temperature. In other words, the melted molding material of the molding material 134 is maintained in the melting temperature which is greater than the temperature of skin solidified layer 131 in the contact sidewall of the cavity 132. In the present invention, the second piezoelectric actuator 112 vibrates the movable core 118 in high frequency for heating the skin solidified layer 131 so that the temperature of the skin solidified layer 131 is maintained between the glass transition temperature (Tg) and the melting temperature (Tm) to improve the effect on groove filling rate of the skin solidified layer 131 in the microstructure 136 wherein the thickness of the microstructure 136 has the range from 0.01 micrometer to 1000 micrometer, preferably from 0.1 micrometer to 100 micrometer.

In one case, a first annular recess 119*a* is provided on a periphery of the movable core 118 is provided for containing the second piezoelectric actuator 112 for reciprocally vibrating the movable core 118 along the second direction Y. In another case, a second annular recess 119*b* is provided on the external periphery of the first piezoelectric actuator 110 to contain the second piezoelectric actuator 112 for reciprocally vibrating the movable core 118 along the second direction Y. Still in various embodiments, a recess is provided for containing the second piezoelectric actuator 112 and the recess is provided in the place selected from one group consisting of a third annular recess 119*c* of a sidewall of the guiding hole 402 of the movable retainer 120, a fourth annular recess 119*d* within the movable retainer 120, a fifth annular recess 119*e* of a periphery of the movable retainer 120 such that the third annular recess 119*c*, the fourth annular recess 119*d* and the fifth annular recess 119*e* are capable of containing the second piezoelectric actuator 112 for reciprocally vibrating the movable core 118 along the second direction Y.

In step S112, a packing step is performed to keep the cavity 132 in a predetermined pressure.

In step S114, a cooling step is performed to cool the molding part 140.

In step S116, a mold open step is performed to separate the stationary structure 102 from the movable structure 106.

In step S118, an ejection step is performed to take out the molding part 140 by ejecting the molding part 140.

Figure 3A:
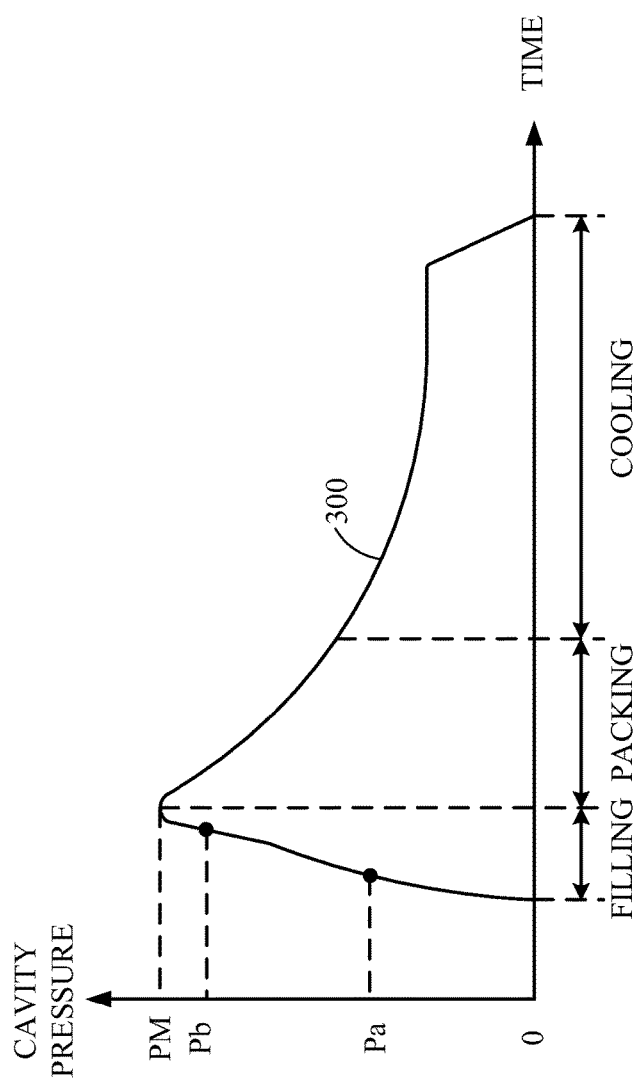
FIG. 3A is a schematic relation curve of cavity pressure and molding time according to one embodiment of the present invention.

FIG. 3A is a schematic relation curve 300 of cavity pressure and molding time according to one embodiment of the present invention. The horizontal axis represents time and the vertical axis represents the cavity pressure in the relation curve 300. The relation curve 300 includes three stages, i.e. filling stage, packing stage and cooling stage where the peak pressure value (PM) defines the maximum pressure value (PM) of the cavity 132 in the filling stage. The in-mold vibratile injection compression molding apparatus 100 of the present invention executes a reciprocal vibration of the molding material in the filling stage for heating the molding material. The reciprocal vibration execution can increase the flowing property of the molding material and the heating process makes the molding material keep in a semi-solidifying state. In one embodiment, the in-mold vibratile injection compression molding method performs the hot embossing manner in form of vibration operation during the filling stage and the pressure interval below the peak pressure value (PM) wherein the pressure interval has a range from 40% of PM, i.e. point Pa in FIG. 3A, to 90% of PM, i.e. point Pb in FIG. 3A. In other words, the pressure sensing signal is less than the peak pressure value (PM) during the filling stage. Thus, based on a predetermined pressure interval associated with the cavity 132 for precisely injecting the molding material 134, the first and second piezoelectric actuators 110, 112 reciprocally vibrate the movable core along the first and second directions X, Y. In another case, the pressure interval can be changed based on the size, the geometric shape and the complexity of the molding material of the molding part 104. While performing a heating process, the molding material is maintained between the glass transition temperature (Tg) and the melting temperature (Tm). In other words, the molding material temperature of the skin solidified layer 131 adjacent to a contact sidewall of the cavity 132 is greater than the glass transition temperature and less than the melting temperature.

Figure 3B:
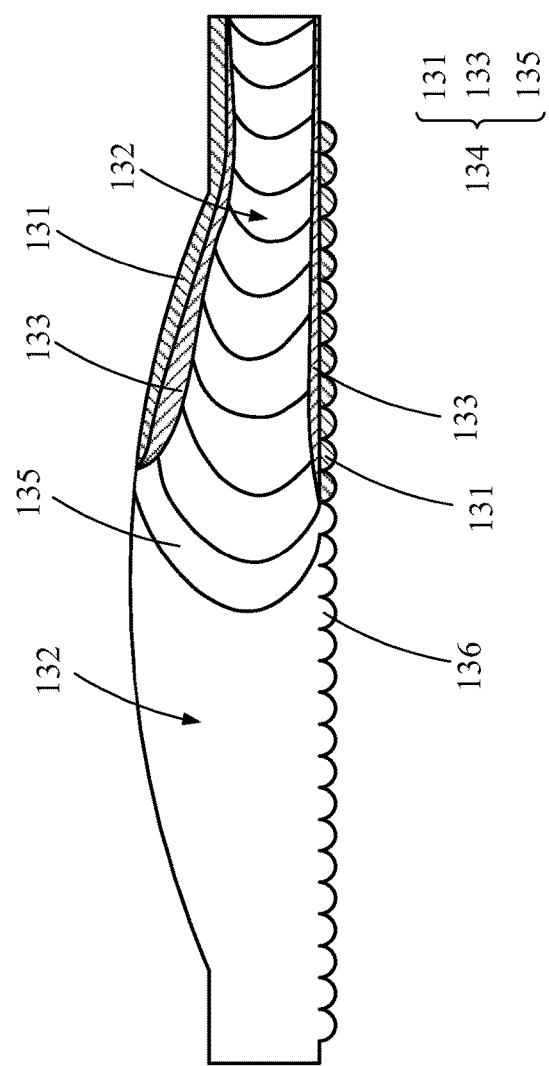
FIG. 3B is a schematic flow status of the molding material moving at a filling flow velocity in the cavity during the filling step according to one embodiment of the present invention.

Refer to FIG. 3B, which is a schematic flow status of the molding material 134 moving at a filling flow velocity in the cavity 132 during the filling step according to one embodiment of the present invention. The bottom surface of the cavity 132 is formed by a microstructure 136. When the molding material 134 is filled into and moves in the cavity 132 during the filling step from the step S100 to the step S110, the molding material 134 forms a skin solidified layer 131, a shear layer 133 disposed on the skin solidified layer 131, and a core layer 135 disposed on the shear layer 133 wherein a portion of the skin solidified layer 131 is formed in the microstructure 136. Preferably, the thickness of the skin solidified layer 131 is less than that of the microstructure 136 during the filling step from the step S100 to the step S110. During the step of filling the molding material into the cavity from the step S100 to the step S110, the method further comprises a step of detecting a thickness of the skin solidified layer 131 of the molding material 134 to compare the thickness of the skin solidified layer 131 and the thickness of the microstructure 136. When the thickness of the skin solidified layer 131 is less than the thickness of the microstructure 136 of the cavity 132, the step S108 and/or step S110 are performed until the thickness of the skin solidified layer 131 is either equal to or greater than the thickness of the microstructure 136 during the step of filling the molding material 134 into the cavity 132 to ensure that the molding material 134 is precisely filled into the microstructure 136.

Figure 3C:
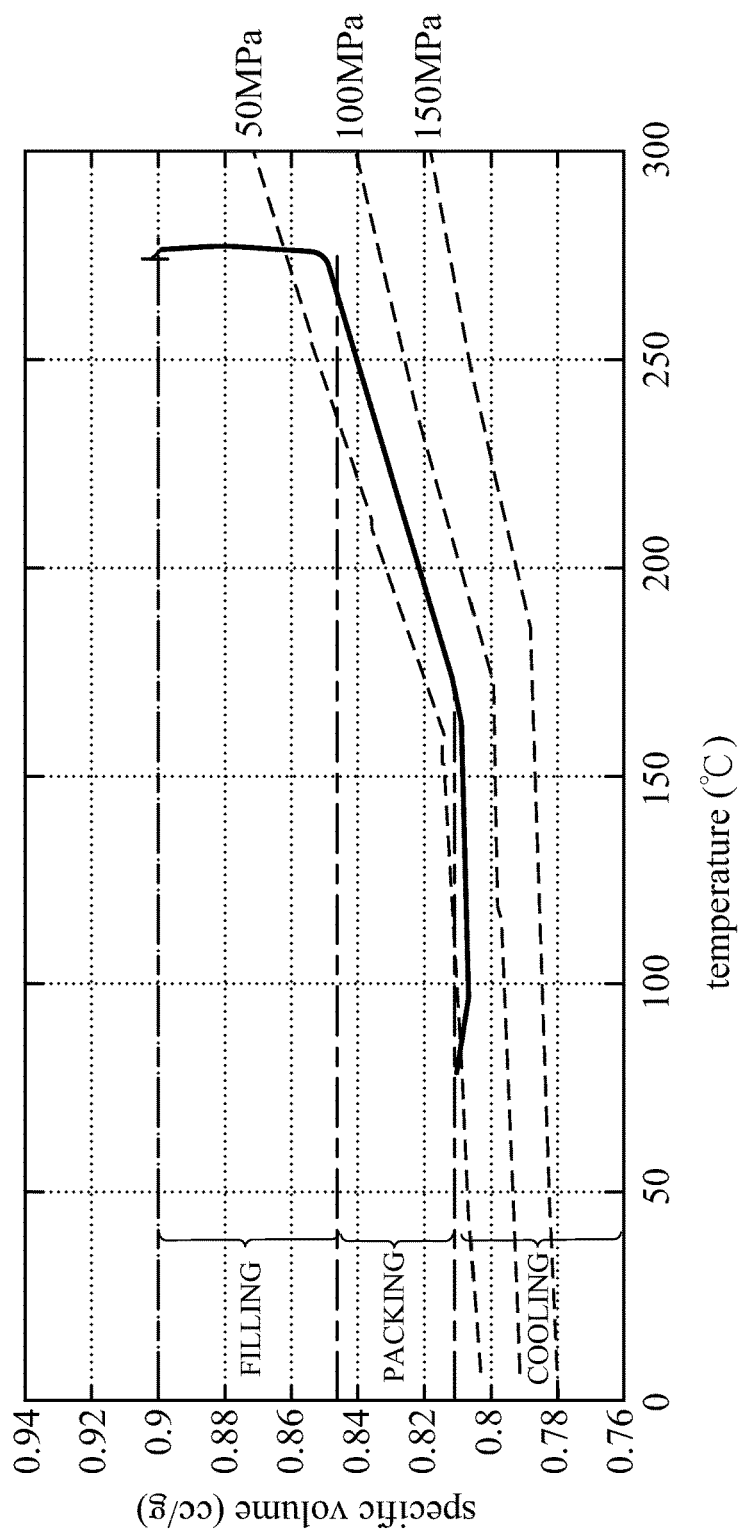
FIG. 3C is a schematic relation curve of a cavity pressure, the specific volume and the temperature of the molding material in the cavity according to one embodiment of the present invention.
Figure 3D:
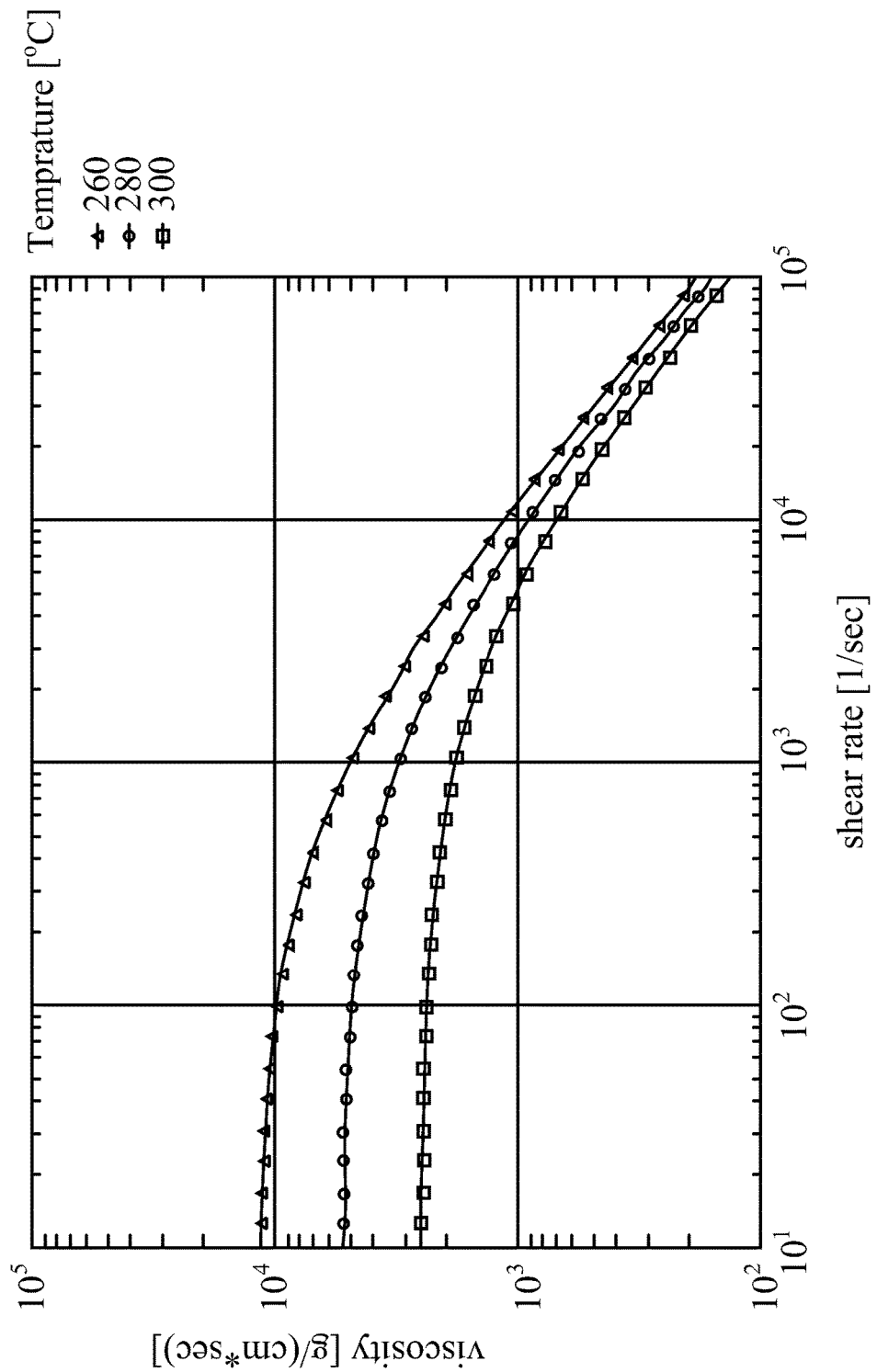
FIG. 3D is a schematic relation curve of the viscosity and the shear rate of the molding material in the cavity according to one embodiment of the present invention.

Refer to FIG. 3C and FIG. 3D. FIG. 3C is a schematic relation curve of a cavity pressure, the specific volume and the temperature of the molding material 134 in the cavity according to one embodiment of the present invention. FIG. 3D is a schematic relation curve of the viscosity and the shear rate of the molding material 134 in the cavity 132 according to one embodiment of the present invention. In FIG. 3C, the horizontal axis represents the temperature (e.g. degree Celsius) and the vertical axis represents the specific volume (e.g. cc/gram), e.g. from 0.83 to 0.9, which is composed of a filling stage, a packing stage and a cooling stage, of the molding material 134 in the cavity 132 based on different cavity pressures, e.g. 50 MPa, 100 MPa and 150 Mpa. In FIG. 3C, the specific volume of the molding material 134 in the cavity 132 is changed by varying the molding material temperature, e.g. the temperature ranging from 270 to 280 degrees Celsius but not limited, to adjust a filling flow velocity and/or injection velocity of the molding material 134 in the cavity 132 during the step of filling the molding material 134 into the cavity 132. For example, when the molding material temperature is increased, the specific volume is increased for raising the filling flow velocity to rapidly move the molding material 134 into the microstructure 136 of the cavity 132 based on the pressure sensing signal during the step S108 and/or step S110 so that the molding material 134 is precisely filled into the microstructure 136. In another case, when the molding material temperature is decreased, the specific volume is decreased for decreasing the filling flow velocity to stably move the molding material 134 into the microstructure 136 of the cavity 132 based on the pressure sensing signal during the step S108 and/or step S110.

In FIG. 3D, the horizontal axis represents the shear rate (e.g. 1/sec) and the vertical axis represents viscosity (e.g. gram/(cm*sec)) based on the different temperatures, e.g. 260, 280 and 300 degrees Celsius but not limited. When a shear rate of the molding material 134 is changed by the filling flow velocity of the molding material 134 based on an adjustment of the molding material temperature, the viscosity of the molding material 134 is adjusted according to the shear rate which is positively related to the filling flow velocity. Specifically, the shear rate of the molding material 134 is increased when a viscosity of the molding material 134 in the cavity 132 is decreased to rapidly move the molding material 134 into the microstructure 136 of the cavity 132 based on the pressure sensing signal so that the molding material 134 is precisely filled into the microstructure 136.

Based on the above-mentioned descriptions, the molding material can be precisely injected to the microstructure in the filling stage based on the skin solidified layer between a glass transition temperature and a melting temperature, the vibrating manner by the first piezoelectric actuator during the filling stage, and the adjustment of the filling flow velocity of the molding material associated with the proper molding material temperature.

Please continuously refer to FIG. 2F. The in-mold vibratile injection compression molding method is performed by an in-mold vibratile injection compression molding apparatus 100, as shown in FIG. 2F. The vibratile injection molding apparatus 100 includes a stationary structure 102, a fixed core 104, a stationary retainer 105, a movable structure 106, a pressure sensor 108, a first piezoelectric actuator 110, a second piezoelectric actuator 112 and a temperature sensor 114. The movable structure 106 includes a first sustaining plate 116, a moveable core 118, a movable retainer 120, a second sustaining plate 122, a first ejection plate 124, a second ejection plate 126, a first moveable molding base 128 and a second moveable molding base 130. The vibratile injection molding apparatus 100 is applicable to an injection molding equipment including a plastic injection molding machine.

The fixed core 104 is disposed in the stationary structure 102 and has a first end portion 104a and a second end portion 104b opposite to the first end portion 104a. The movable structure 106 is correspondingly disposed to the stationary structure 102 for either separating from the stationary structure 102 or contacting the stationary structure 102 along a first direction X. The movable structure 106 includes a movable core 118 having a third end portion 118a and a fourth end portion 118b corresponding to the third end portion 118a, and a cavity 132 is formed by the first end portion 104a of the fixed core 104 and the third end portion 118a of the movable core 118 to contain a molding material 134 shown in FIG. 2B.

The pressure sensor 108 is disposed in the stationary structure 106 and coupled to the fixed core 104 for sensing a pressure value of the cavity and outputting a pressure sensing signal associated with the pressure value. The first piezoelectric actuator 110 is disposed in the movable structure 106 and coupled to the fourth end portion 118b of the movable core 118 for reciprocally vibrating the movable core 118 along the first direction X based on the pressure sensing signal. The second piezoelectric actuator 112 is disposed in the movable structure 106 for reciprocally vibrating the movable core 118 along a second direction Y based on the pressure sensing signal wherein the first direction X is different from the second direction Y. Preferably, the first direction X is perpendicular to the second direction Y.

A periphery of the movable core 118 includes a first annular recess 119a to contain the second piezoelectric actuator 112 and the first annular recess 119a is adjacent to the third end portion 118a so that the second piezoelectric actuator 112 is near the cavity 132. In other words, the first annular recess 119a of movable core 118 provides the position for the second piezoelectric actuator 112 to generate the reciprocal vibration along the second direction Y, which cooperate with the reciprocal vibration of the first piezoelectric actuator 110 along the first direction X. The first piezoelectric actuator 110 and the second piezoelectric actuator 112 utilize the vibration of converse piezoelectric effect on piezoelectric material along the first and second directions X, Y. Thus, when a voltage, e.g. negative voltage or positive voltage, is exerted on the first piezoelectric actuator 110 and the second piezoelectric actuator 112, the movable core 118 is driven to be oscillated along the first and second directions X, Y. It should be noted that the vibration distance of the first piezoelectric actuator 110 and the second piezoelectric actuator 112 is less than the tolerance thickness of the molding part 140. Therefore, the in-mold vibratile injection compression molding method and molding apparatus thereof utilizes the piezoelectric actuators to precisely control the vibration movement of the movable core 118 in a predetermined frequency to improve groove filling rate of the microstructure.

The temperature sensor 114 disposed in the stationary structure 102 senses the molding material temperature in the cavity 132 for outputting a temperature sensing signal corresponding to the molding material temperature. If the pressure sensing signal is less than a peak pressure value of cavity 132, the molding material temperature is between the glass transition temperature (Tg) and the melting temperature (Tm) wherein the peak pressure value is the maximum pressure value (PM) of the cavity 132. Preferably, the amplitude of the pressure sensing signal has a range from 40% of PM, i.e. point Pa in FIG. 3A, to 90% of PM, i.e. point Pb in FIG. 3A. In one case, the amplitude of the pressure sensing signal is the arbitrary pressure interval below the maximum pressure value (PM).

In one embodiment, a surface of the first end portion 104a of the fixed core 104 is either an aspheric shape or a spherical shape corresponding to the cavity 132, and a surface of the third end portion 118a of the movable core 118 is a microstructure 136 corresponding to the cavity 132. The microstructure 136 is used to produce one selected from one group consisting of Fresnel lens, micro-lens array structure and secondary optical lens of light-emitted diode (LED). For example, lens packed on the LED is defined as first optical lens and the secondary optical lens of LED is used to regulate the light beam so that the light from the LED source is uniformed and comfortable for the users. The incident surface and the emitted surface of the secondary optical lens of LED are formed by spray technique on the surface of the core and the shape corresponding to the microstructure 136 is formed by injection molding.

Figure 4:
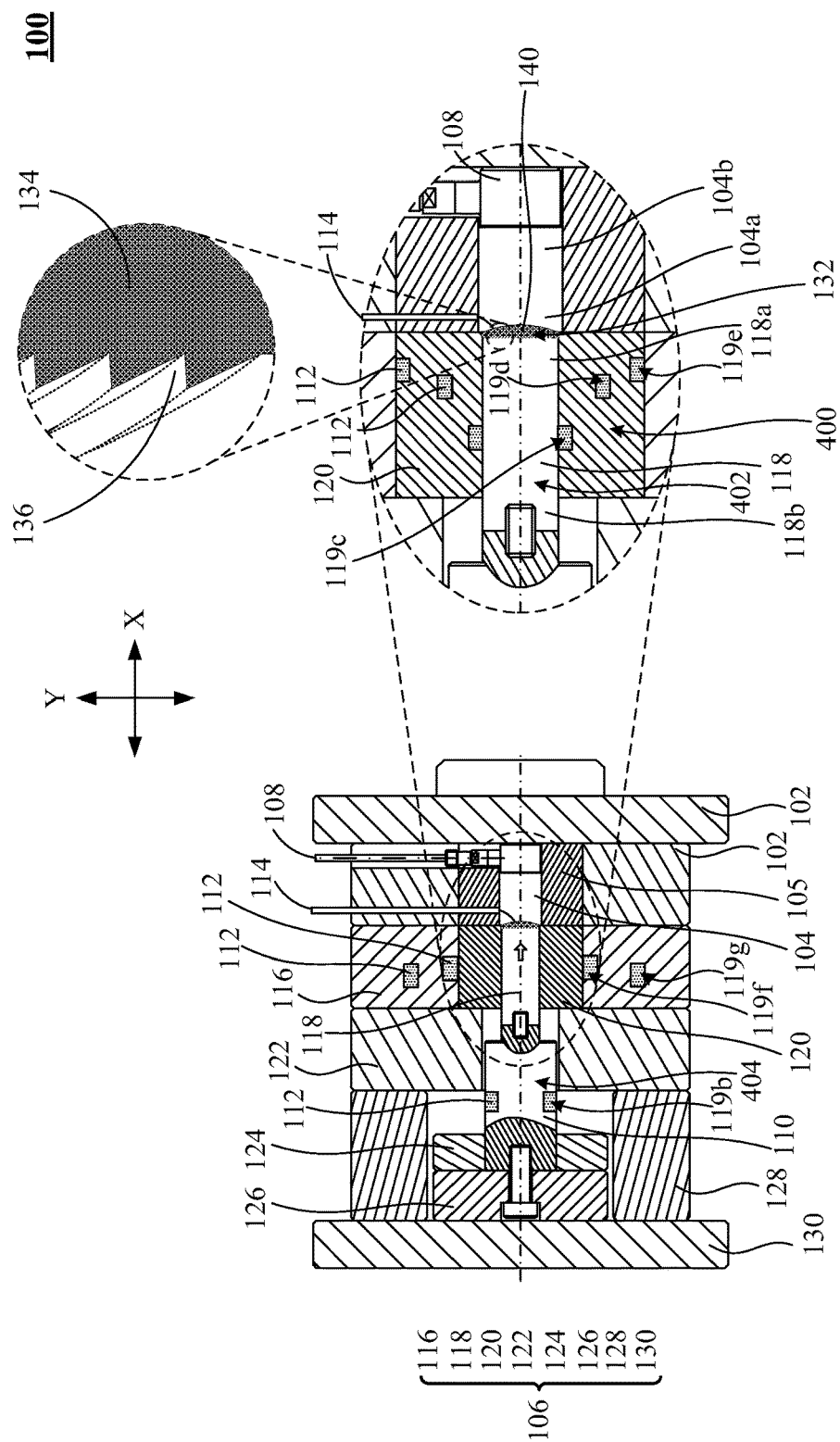
FIG. 4 is a schematic local cross-sectional view of the in-mold vibratile injection compression molding apparatus according to various embodiments of the present invention.

FIG. 4 is a schematic local cross-sectional view of the in-mold vibratile injection compression molding apparatus 100 according to various embodiments of the present invention. In the movable structure 106, the first sustaining plate 116 is correspondingly disposed to the stationary structure 106 and has a first hollow hole 400. The movable retainer 120 is secured to the first hollow hole 400 and has a guiding hole 402 for reciprocally vibrating the movable core 118 along the first direction X within the guiding hole 402. The second sustaining plate 122 is secured to the first sustaining plate 116 and the movable retainer 120 wherein the second sustaining plate 122 includes a second hollow hole 404 for receive one end portion of the first piezoelectric actuator 110.

The second annular recess 119b of the external periphery of the first piezoelectric actuator 110 is provided for containing the second piezoelectric actuator 112. That is, the first piezoelectric actuator 110 is integrated to the second piezoelectric actuator 112 to be an integrated piezoelectric actuator to generate high frequency vibration along the bi-direction X and Y. A third annular recess 119c is disposed in a sidewall of the guiding hole 402 of the movable retainer 120, a fourth annular recess 119d is disposed within the movable retainer 120, a fifth annular recess 119e is disposed in a periphery of the movable retainer 120 so that the third annular recess 119c, the fourth annular recess 119d and the fifth annular recess 119e can contain the second the second piezoelectric actuator 112. The sixth annular recess 119f is disposed in a sidewall of the first hollow hole 400 of the first sustaining plate 116 and a seventh annular recess 119g is disposed within the first sustaining plate 116 such that the sixth annular recess 119f and the seventh annular recess 119g can contain second the second piezoelectric actuator 112. The aforementioned annular recess enable the second piezoelectric actuator 112 vibrates along the directions X and Y for uniformly injecting the molding material to the microstructure 136 in form of semi-solidifying state.

FIGS. 5A-5C are schematic plane views of the molding parts according to various embodiments of the present invention. As shown in FIG. 5A, a simple hybrid optical lens 500 includes an aspheric lens 500a and a Fresnel lens 500b formed by a microstructure 136. As shown in FIG. 5B, a micro-lens array structure 502 includes an aspheric lens 502a and micro-lens array 502b formed by a microstructure 136. As shown in FIG. 5C, a secondary optical lens 504 of light-emitted diode (LED) includes an aspheric lens 504a and a secondary optical structure 504b formed by a microstructure 136.

According to the above-mentioned descriptions, the present invention provides an in-mold vibratile injection compression molding method and molding apparatus thereof. When the first and second piezoelectric actuators reciprocally vibrate along at least two directions, the molding material can be precisely injected to the microstructure. Therefore, the form error, the groove filling rate and the residual stress associated with the molding part are effectively improved.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. An in-mold vibratile injection compression molding method applicable to an in-mold vibratile injection compression molding apparatus, wherein the in-mold vibratile injection compression molding apparatus comprises a stationary structure, a fixed core, a movable unit comprising a movable core and a movable retainer, a pressure sensor, a first piezoelectric actuator, a second piezoelectric actuator, and wherein the fixed core is placed opposite to the movable core to form a cavity with a microstructure and the movable retainer has a guiding hole, the in-mold vibratile injection compression molding method comprising the steps of:

(a) filling a molding material into the cavity, wherein a temperature sensor is configured to sense molding material temperature of a skin solidified layer in the cavity and the second piezoelectric actuator is configured to vibrate and heat the skin solidified layer in the cavity, such that the molding material temperature of a skin solidified layer in the cavity is maintained between a glass transition temperature and a melting temperature of the skin solidified layer in the cavity based on the temperature sensor and the second piezoelectric actuator;

(b) closing the movable core and the fixed core together such that the molding material is injected by the movable core to perform an injection compression process;

(c) sensing a pressure value of the cavity by the pressure sensor and outputting a pressure sensing signal;

(d) reciprocally propelling the movable core by the first piezoelectric actuator for reciprocally vibrating the movable core along a first direction in accordance with the pressure sensing signal when the pressure sensing signal is less than a peak pressure value of the cavity during the step of filling the molding material into the cavity; and (e) reciprocally propelling the movable core by the second piezoelectric actuator for reciprocally vibrating the movable core along a second direction in accordance with the pressure sensing signal when the pressure sensing signal is less than the peak pressure value during the step of filling the molding material into the cavity wherein the first direction is different from the second direction.

2. The in-mold vibratile injection compression molding method of claim 1, wherein during the step (e), a recess is provided for containing the second piezoelectric actuator for reciprocally vibrating the movable core along the second direction, and the recess is provided in the place selected from one group consisting of a first annular recess of a periphery of the movable core, a second annular recess of an external periphery of the first piezoelectric actuator, a third annular recess of a sidewall of the guiding hole, a fourth annular recess within the movable retainer, a fifth annular recess of a periphery of the movable retainer and the combinations thereof.

3. The in-mold vibratile injection compression molding method of claim 1, after the step (c), further comprising a step of: outputting a temperature sensing signal corresponding to the molding material temperature.

4. The in-mold vibratile injection compression molding method of claim 1, wherein an amplitude of the pressure sensing signal comprises a range from 40% of a maximum pressure value (PM) of the cavity to 90% of the PM of the cavity, and wherein the skin solidified layer is operated in a liquid phase and a semi-liquid phase of the molding material during the step of filling the molding material.

5. The in-mold vibratile injection compression molding method of claim 1, during the step of filling the molding material into the cavity, further comprising a step of detecting a thickness of the skin solidified layer of the molding material when the thickness of the skin solidified layer in the cavity corresponds to the molding material temperature that is sensed by the temperature sensor, such that the thickness of the skin solidified layer is compared with a thickness of the microstructure.

6. The in-mold vibratile injection compression molding method of claim 5, wherein when the thickness of the skin solidified layer is less than the thickness of the microstructure of the cavity, the step (d) and/or step (e) are performed until the thickness of the skin solidified layer is either equal to or greater than the thickness of the microstructure during the step of filling the molding material into the cavity.

7. The in-mold vibratile injection compression molding method of claim 1, wherein a specific volume of the molding material in the cavity is changed by varying the molding material temperature to adjust a filling flow velocity of the molding material in the cavity during the step of filling the molding material into the cavity.

8. The in-mold vibratile injection compression molding method of claim 7, wherein when the molding material temperature is increased, the specific volume is increased for raising the filling flow velocity to rapidly move the molding material into the microstructure of the cavity based on the pressure sensing signal during the step (d) and/or step (e).

9. The in-mold vibratile injection compression molding method of claim 7, wherein when the molding material temperature is decreased, the specific volume is decreased for decreasing the filling flow velocity to stably move the molding material into the microstructure of the cavity based on the pressure sensing signal during the step (d) and/or step (e).

10. The in-mold vibratile injection compression molding method of claim 7, wherein when a shear rate of the molding material is changed by the filling flow velocity of the molding material based on an adjustment of the molding material temperature, a viscosity of the molding material is adjusted according to the shear rate which is positively related to the filling flow velocity.

11. The in-mold vibratile injection compression molding method of claim 10, wherein the shear rate of the molding material is increased when a viscosity of the molding material in the cavity is decreased to rapidly move the molding material into the microstructure of the cavity based on the pressure sensing signal.

12. The in-mold vibratile injection compression molding method of claim 1, wherein a thickness scale of the microstructure has a range from 0.01 micrometer to 1000 micrometer.

13. The in-mold vibratile injection compression molding method of claim 12, wherein the thickness scale of the microstructure has the range from 0.1 micrometer to 100 micrometer.

14. The in-mold vibratile injection compression molding method of claim 1, wherein an injection velocity of the molding material is initially adjusted to control an initial velocity of the molding material before the step of filling the molding material into the cavity.

* * * * *